Sept. 13, 1966  A. SUTARUK  3,272,292

VISCOUS FLUID CLUTCH HAVING HEAT DISSIPATION MEANS

Filed Oct. 11, 1963

INVENTOR.
ALEX SUTARUK
BY Williams, David,
Hoffmann & Yount
ATTORNEYS

United States Patent Office 3,272,292
Patented Sept. 13, 1966

3,272,292
VISCOUS FLUID CLUTCH HAVING HEAT DISSIPATION MEANS
Alex Sutaruk, Hazel Park, Mich., assignor to Eaton Yale & Towne Inc., a corporation of Ohio
Filed Oct. 11, 1963, Ser. No. 315,581
3 Claims. (Cl. 192—58)

The present invention relates to a drive coupling of the type embodying a fluid medium for transmitting torque between relatively rotatable input and output coupling members, and particularly, to a shear type fluid drive coupling wherein a fluid shear medium transmits torque between the rotatable coupling members. Fluid couplings, of the above noted type, are usable for driving various different kinds of load devices and have particular utility for driving an engine accessory such as a cooling fan device of an internal combustion engine.

The principal object of the present invention is to provide a new and improved simple shear type fluid coupling having improved heat dissipation means formed integrally with one of the coupling members and providing a substantial cooling area for highly effective dissipation of the heat produced in the transmission of torque between the relatively rotatable coupling members.

A further object of the present invention is the provision of a new and improved shear type fluid coupling wherein fin means are provided for dissipating the heat produced by the transmission of torque between the coupling members and wherein the fin means have extended portions shaped to produce a blower effect to induce an air flow through the fins to facilitate cooling of the coupling members.

A further object of the present invention is the provision of a new and improved shear type fluid coupling including blower blade means effective to provide a steady nonturbulent flow of air across a temperature responsive device to prevent stagnation of air around the temperature responsive device and thereby render the latter more accurately responsive to the temperature of the atmosphere around the coupling.

A further object of the present invention is the provision of a new and improved coupling device including a plurality of blower blades supported by one of the coupling members and extending at an angle so as to produce a flow of air as the coupling member rotates and wherein the blower blade members are located on the outer periphery of one of the coupling members and extend nonradially of the coupling member and forwardly of the coupling member from a web member which is connected to the coupling and which encircles the periphery of the coupling member.

Yet another object of the present invention is the provision of a new and improved fluid coupling wherein one of the coupling members is rotatably supported by a bearing means and supports cooling fins having a heat sink conducting portion extending in close proximity to the bearing means for conducting heat from the bearing means so that the bearing runs cool.

Further objects and advantages of the present invention will be apparent to those skilled in the art to which it relates from the following detailed description thereof made with reference to the accompanying drawings forming a part of this specification, and in which, FIG. 1 is an axial sectional view of a fluid coupling embodying the present invention taken approximately as indicated by section line 1—1 in FIG. 2;

Figure 1:
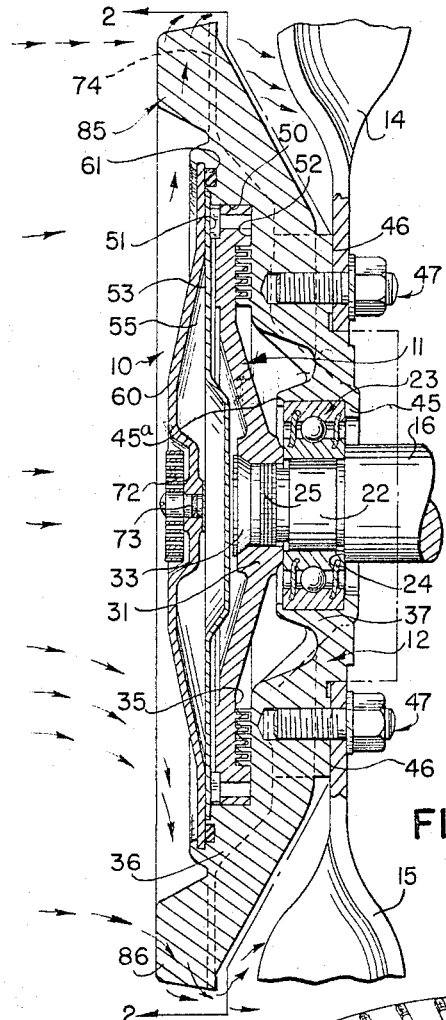

The present invention provides a new and improved fluid coupling including relatively rotatable coupling members having a fluid shear space therebetween and which are cooperable with a fluid shear medium within the shear space to provide a shear type fluid drive therebetween. Fluid couplings of this type are extremely useful in the driving of engine accessories, and the specific embodiment of the present invention shown in the drawings and to be described hereinbelow illustrates the fluid coupling of the present invention as forming a drive for a cooling fan device of an internal combustion engine. It should be understood, however, that the coupling device of the present invention may be used for driving other load devices.

The preferred and illustrated embodiment of the present invention is shown in the drawings and comprises a fluid coupling device 10 including an input coupling member 11 and an output coupling member 12. The coupling 10 is shown as a drive for a vehicle cooling fan device, as noted above, and includes cooling fan blades 14 and 15 which are driven from the engine (not shown) through the fluid coupling 10.

The fluid coupling 10 includes an input shaft 16 on which input member 11 is mounted and which is rotatable by a suitable drive means such as a pulley member (not shown) driven from the engine. The input shaft 16 has, intermediate its ends, a reduced shaft portion 22 functioning as a support for the inner race of a ball bearing assembly 23. A shoulder 24 on the shaft 16 prevents movement of the ball bearing assembly in one direction, namely to the right, as viewed in FIG. 1. Another shaft portion 25 is provided with surface serrations.

The rotatable input or driving coupling member 11 of the fluid coupling 10 is in the form of a disk having a hub portion 31 supported on the shaft 16. The hub portion 31 has an opening therethrough which has an interference fit with the shaft portion 25. Hub portion 31 is pressed onto the shaft 16 until the inner surface of the hub 31 abuts the side of the inner race of the ball bearing assembly 23 and thus prevents movement of the ball bearing assembly 23 to the left, as viewed in FIG. 1. The left end of the shaft portion 16 is flared or "balled over" at 33 so as to hold the input coupling member from movement toward the left, as viewed in FIG. 1. From the above description it should be apparent that rotation of shaft 16 causes the input coupling 11 to be rotated therewith.

The input coupling member 11 rotates in a fluid working or operating chamber means 35 formed by the rotatable output or driven coupling member 12. The output coupling member 12 is in the form of a housing and includes a main housing member 36 having a hub portion 37 which has an opening therethrough. The opening through the hub portion 37 has an interference fit with the outer race of the ball bearing assembly 23 and is supported thereby for rotation about the axis of the shaft 16. A flange portion 45 engages the right side of the outer race of the ball bearing assembly 23, as viewed in FIG. 1, and blocks housing member 36 from movement in one axial direction. A portion of the housing member is spun over, as indicated at 45a to engage the left side of the outer race of the ball bearing assembly 23, as viewed in FIG. 1. The fan blades 14 and 15 are secured to surface portions 46 of the housing member 36 by stud and nut assemblies 47, so as to rotate with the housing member 36.

The fluid chamber means 35 formed by the output member 12 includes a cylindrical surface 50 coaxial with the shaft 16 and axially spaced end surfaces 51 and 52. The cylindrical surface 50 is provided by a bore in the housing member 36 and the end surface 52 is located at the bottom of the bore. The end surface 51 is provided by a partition member 53 supported by the housing member, separating the fluid working chamber 35 from a fluid reservoir chamber 55. The fluid reservoir chamber 55 is defined by a cover member 60 which is spaced axially outwardly of the partition member and is dish shaped to thereby provide the reservoir chamber therebetween. The cover member is supported and secured to the housing member 36 for rotation therewith. A suitable sealing means 61 is provided in order to prevent fluid flow between the housing member 36 and the cover member 60.

As mentioned above, the input member 11 is rotatable in the fluid working chamber 35. The input member 11 includes a plurality of radially spaced, circumferentially extending projections which extend substantially parallel to the axis of rotation of the coupling members and interfit with projections extending from the end surface of the chamber into the spaces between the projections on the input member 11. The interfitting projections provide opposed, substantially parallel spaced surfaces defining a shear space therebetween. When the input member 11 is rotated a fluid shear medium positioned in the shear spaces is effective to transmit torque between the opposed surfaces and thereby causes transmission of torque from the input coupling member 11 to the output coupling member 12.

As is well known to those skilled in the fluid coupling art to which the present invention relates, the amount of torque transmitted from the input member 11 to the output member 12 is a function of the volume of the fluid in the fluid working chamber, and specifically in the above mentioned shear spaces. In the event fluid is not located in any of the shear spaces, no torque is transmitted between the input and output members. On the other hand, when fluid fills or partially fills the shear spaces torque is transmitted therebetween. It should be apparent from the above description that when there is no fluid in the working or operating chamber 35 and consequently no fluid in the shear spaces, there would be no transmission of torque between the input and output coupling members and that as the amount of fluid in the shear spaces increases an increasing amount of torque is transmitted between the input and output members and the speed differential between the members is decreased.

In order to vary the volume of fluid in the working chamber and thus vary the torque transmitted and the speed differential between the input and output coupling members, the fluid coupling 10 includes a means providing for fluid flow into and out of the working chamber. The means providing for fluid flow into and out of the working chamber may be of any form and reference is made to United States Letters Patent 3,055,473 issued September 25, 1962, for a specific description of a suitable mechanism for varying the volume of fluid in the working chamber, which mechanism may be used herein.

For purposes of this application it should suffice to say that the mechanism for providing for fluid flow between the reservoir chamber and the working chamber includes fluid conducting passage means communicating the working and reservoir chambers and for conducting fluid into the working chamber and from the working chamber. The mechanism to effect flow between the chambers includes a helically wound, bimetallic temperature responsive coil means 72 supported by the cover member 60 coaxial with the coupling members 11, 12. One end of the helically wound, bimetallic temperature responsive means is positioned between retaining means formed on the cover member and the other end is positioned in a slot formed in a stub shaft 73 rotatably supported by the cover member, coaxial with shaft 16. One end of the stub shaft 73 receives the end of the bimetallic coil and is pinched together so as to hold the end of the helically wound coil onto the stub shaft. The bimetallic coil 72 is responsive to changes in temperature to effect rotation of stub shaft 73 which in turn effects fluid flow between the chambers, in a well known manner.

According to the present invention, the fluid coupling 10 is provided with a large cooling fin area for extremely effective heat dissipation for dissipating the heat produced by the transmission of torque between the coupling members 11, 12. To this end a web member 74 preferably is provided encircling the housing coupling member 12 and positioned on the outer periphery of the coupling member 12 in a surrounding relation with respect thereto. The surface of the coupling member 12 on which the fan blades are mounted supports fin means 75 for dissipating the heat produced by the transmission of torque between the coupling members. The fin means 75 include a plurality of circumferentially spaced fin members 76 which extend from adjacent the bearing assembly 23 to adjacent the outer periphery of the web member 74 and diverge as they extend outwardly. These fin members 76 provide not only for effective dissipation of the heat produced by the transmission of torque between the coupling members but also provide an effective heat sink portion 76a adjacent the bearing assembly 23 so as to dissipate the heat from the bearing assembly 23 and thus permit the bearing to run cool.

Each of the fin members 76 includes a portion 77 which extends radially of the coupling member and which has one of its ends adjacent the bearing, as described above, and provides the heat sink portion 76a. The portions 77 extend radially of the coupling member 12 to the inner diameter of the web member 74. Each fin member 76 further includes a fin portion 78 connected to portion 77 and extending from the inner diameter of the web member 74 to adjacent the outer diameter thereof. Each of the fin portions 78 are suitably connected to the web member and extend nonradially and at an angle to its associated radially extending fin portion 77.

The fin means 75 also includes a plurality of fin members 80 which are positioned in the spaces between the above described fin members 76 and which thereby alternate with the above described fin members 76 around the circumference of the coupling member 12. These fin members 80 are shorter in length than the above described fin members 76, and include a first portion 81 which extends radially of the coupling member 12 from a point intermediate the ends of the above described fin members 76 to the inside diameter of the web member 74 and a second portion 82 connected to the web member 74 and extending at an angle to the first portion 81 thereof, which angle is the same as the angle at which the portions 78 extend with respect to the radially extending portions 77 of the fin members 76.

The coupling device 10 further includes blower blade means 85 for providing a flow of air around the coupling device and across the temperature responsive device to prevent stagnation of air in the region of the temperature responsive device and thereby render the latter more responsive to actual temperature changes and not responsive to restricted or trapped temperatures which are not indicative of the temperature surrounding the coupling as a whole. The blower blade means 85 preferably comprises a plurality of blower blade members 86 located radially outwardly of the temperature responsive device 72. The blower blade members 86 and the fin members 76, 80 are preferably formed integral with the coupling member 12 and as a one-piece casting providing effective heat dissipation means and yet easily manufactured.

The coupling device 10, as shown in the drawings, is located in the ram air stream adjacent the radiator (not shown) of the vehicle. The blower blade members 86 extend forwardly of the coupling 10 and in a sense are extensions of the fin members and extend into the ram air stream. The ram air stream and the air flow around the coupling 10 is indicated by the arrows in FIG. 1. The blower blade members 86 are connected to the web member 74 and extend nonradially from the inner diameter of the web member 74 to the outer diameter thereof.

The direction of rotation of the coupling members and the particular inclination of the blower blade members 86 causes the ram air, which is directed toward the center of the coupling device, to be moved radially and across the bimetallic coil 72. This air flow is directed between the blower blade members 86 and radially outwardly of the coupling and into the ram air stream beyond the outer periphery of the coupling which ram air stream is being drawn into the fan blades 14, 15. The blower blade members 86 are thus located so that air flows therebetween, as above described, which air functions to cool the blower blade members 86. This provides for highly effective dissipation of the heat produced by the transmission of torque between the coupling members. Moreover, the radial flow of air, as described above, prevents the stagnation of air in the area adjacent the bimetallic temperature responsive coil 72 and thereby renders the temperature responsive coil 72 responsive to temperature of the ambient atmosphere and not to the temperature of a trapped air pocket or a turbulent air flow.

While the above-described preferred embodiment of the present invention has been described for use as a fan drive and located in a ram air stream, it should be understood that the blower blades function in the same manner as described above even though the coupling device is used in an environment where there is no ram air stream. Moreover it should be understood that the particular shape and arrangement of the fin members can be varied as well as the particular shape and arrangement of the blower blade members to effect the desired results as described herein. For example, the blower blade members could be made arcuate in cross-section and the fin members may be arranged on the coupling member 12 in a less advantageous way than described hereinabove.

Figure 2:
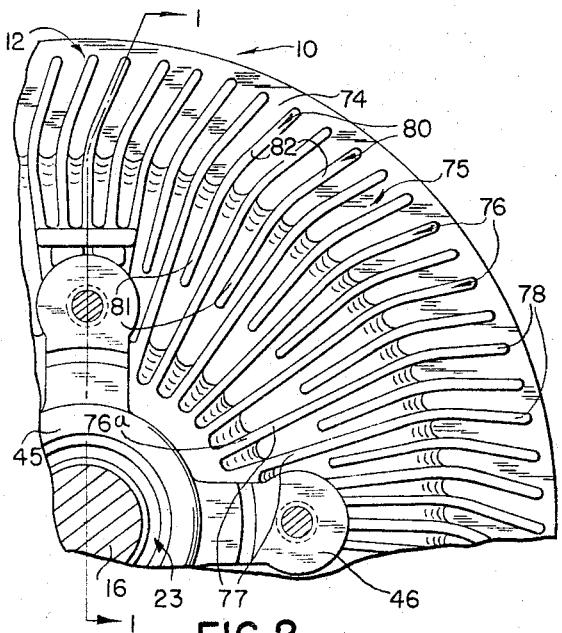
FIG. 2 is an enlarged fragmentary end sectional view of the fluid coupling of FIG. 1 taken approximately on line 2—2 of FIG. 1.
Figure 5:
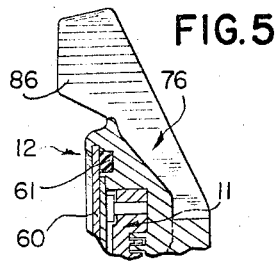
FIG. 5 is a transverse sectional view taken approximately along the section line 5—5 of FIG. 4.
Figure 3:
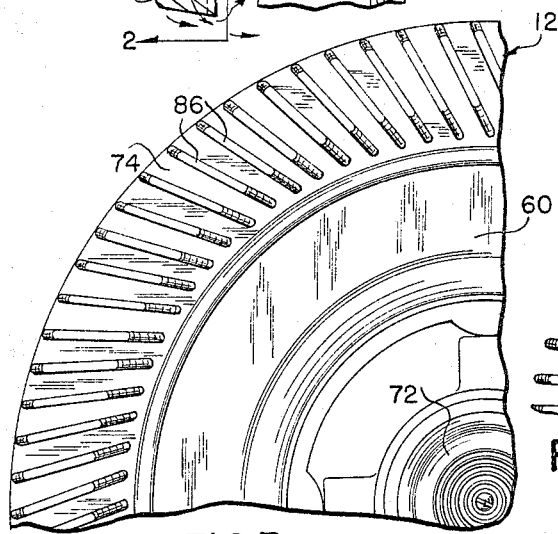
FIG. 3 is an enlarged fragmentary end elevational view of the fluid coupling of FIG. 1 looking at the fluid coupling of FIG. 1 from the left.
Figure 4:
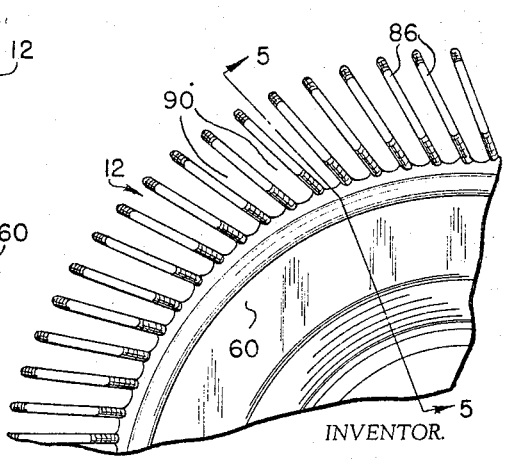
FIG. 4 is a partial end view of a modified fluid coupling embodying the present invention.

A modified embodiment of the present invention is shown in FIGS. 4 and 5. In the embodiment of FIGS. 4 and 5 the same reference numerals are used to indicate structure which corresponds with the structural elements of the coupling of FIGS. 1 to 3. The difference in structure in the modification of FIGS. 4 and 5 over that of FIG. 1 is that the web member 74 has been eliminated and the blower blades 86 which project forwardly of the coupling member 10 are formed as an extension of the fin members 76, 80 and are provided with spaces between the adjacent blower blades 86 which communicate with the spaces between the fin members, forming a continuous channel 90. Of course, in this modification it should be apparent that the number of blower blades is equal to the number of fin blade members and that the blower blade members will function to provide for air flow through the continuous channels 90 to provide for extremely effective dissipation of the heat produced by the transmission of torque between the coupling members.

It should be understood that the present invention has been described hereinabove in considerable detail and that certain modifications, adaptations and changes therein may be made by those skilled in the art to which it relates and that it is hereby intended to cover all changes, adaptations and modifications which fall within the scope of the appended claims.

Having described my invention, I claim:

1. A drive coupling comprising first and second relatively rotatable coupling members, said first coupling member defining a fluid chamber in which said second coupling member is rotatable, said first and second coupling members having opposed spaced parallel surfaces defining a fluid shear space therebetween and cooperable with a fluid shear medium in said shear space to provide a shear-type fluid drive therebetween, means for varying the volume of fluid shear medium in said shear space to vary the torque transmitted between said first and second coupling members including a temperature responsive device located on a forward face of said first coupling member and responsive to the temperature of the atmosphere adjacent said forward face to effect a change in the volume of the fluid shear medium in said shear space, a plurality of blower blade means disposed circumferentially about and in surrounding relation to said temperature responsive device and connected to said first coupling member, said blower blade means being inclined with respect to a radial line extending through the axis of rotation of said coupling members for creating a flow of air across said temperature responsive device to prevent stagnation of air around said temperature responsive device.

2. A drive coupling of the type defined by claim 1 wherein said blower blade means extend from said first coupling member axially beyond said temperature responsive device.

3. A drive coupling as defined in claim 1 and further including fin means supported by said coupling member for dissipating heat produced by the transmission of torque between said coupling members, said fin means including radially extending inner portions located adjacent the axis of rotation of said first coupling member and outer portions radially inclined with respect to said inner portions, a web member connected to the outer periphery of said first coupling member and encircling said first coupling member, said outer portions of said fin means terminating at a side of said web member and said blower blade means connected to a side of said web member opposite the side at which said second portions of said fin means terminate.

References Cited by the Examiner

UNITED STATES PATENTS

| | | | |
|---|---|---|---|
| 2,948,268 | 8/1960 | Roper et al. | 192—58 X |
| 3,007,560 | 11/1961 | Weir | 192—58 |
| 3,053,363 | 9/1962 | Weir | 192—58 |
| 3,055,473 | 9/1962 | Oldberg et al. | |
| 3,059,745 | 10/1962 | Taaschek | 192—58 |
| 3,075,691 | 1/1963 | Kelley. | |
| 3,171,527 | 3/1965 | Ott | 192—113 |
| 3,174,600 | 3/1965 | Oldberg | 192—58 |

DAVID J. WILLIAMOWSKY, *Primary Examiner.*

DON A. WAITE, *Examiner.*

A. T. McKEON, *Assistant Examiner.*